United States Patent
Barralon et al.

(10) Patent No.: US 10,372,099 B2
(45) Date of Patent: Aug. 6, 2019

(54) METHOD FOR CONFIGURING AN ACTUATOR FOR THE OPERATION OF A MOVING ELEMENT IN A HOME-AUTOMATION DEVICE, AND ACTUATOR OPERATING BY THIS METHOD

(71) Applicant: SOMFY SAS, Cluses (FR)

(72) Inventors: Eric Barralon, Eteaux (FR); Jean-François Bocquet, Sallanches (FR)

(73) Assignee: SOMFY SAS, Cluses (FR)

( * ) Notice: Subject to any disclaimer, the term of this patent is extended or adjusted under 35 U.S.C. 154(b) by 310 days.

(21) Appl. No.: 15/313,227

(22) PCT Filed: May 22, 2015

(86) PCT No.: PCT/EP2015/061480
§ 371 (c)(1),
(2) Date: Nov. 22, 2016

(87) PCT Pub. No.: WO2015/177374
PCT Pub. Date: Nov. 26, 2015

(65) Prior Publication Data
US 2017/0192404 A1    Jul. 6, 2017

(30) Foreign Application Priority Data

May 23, 2014 (FR) .................... 14 54663

(51) Int. Cl.
*H02P 3/00* (2006.01)
*G05B 19/045* (2006.01)
(Continued)

(52) U.S. Cl.
CPC .......... *G05B 19/045* (2013.01); *G05B 19/02* (2013.01); *G05B 19/416* (2013.01);
(Continued)

(58) Field of Classification Search
CPC .......... G05B 19/045; G05B 19/02; H02P 7/00
(Continued)

(56) References Cited

U.S. PATENT DOCUMENTS 5,378,861 A * 1/1995 Barten .................... G05D 3/00
187/316
5,729,101 A   3/1998 Richmond et al.
(Continued)

FOREIGN PATENT DOCUMENTS

CN    1458382 A    11/2003
CN    1602457 A     3/2005
(Continued)

OTHER PUBLICATIONS

International Search Report and Written Opinion dated Aug. 31, 2015 issued in corresponding international application No. PCT/EP2015/061480; w/ English partial translation and partial machine translation (16 pages).

(Continued)

*Primary Examiner* — Eduardo Colon Santana
*Assistant Examiner* — Gabriel Agared
(74) *Attorney, Agent, or Firm* — Westerman, Hattori, Daniels & Adrian, LLP

(57) ABSTRACT

Method for configuring an actuator (2) for the operation of a moving element (3) for closure, solar protection, privacy or screening, said actuator comprising a gear motor (4) and a gear motor electronic control unit (5), said electronic control unit incorporating a memory (51) in which at least one range of travel of the element has been pre-recorded, and said method comprising a step for the relative modification of the magnitude of at least one range.

20 Claims, 4 Drawing Sheets

(51) Int. Cl.
*G05B 19/416* (2006.01)
*G05B 19/02* (2006.01)

(52) U.S. Cl.
CPC .............. *G05B 2219/43081* (2013.01); *G05B 2219/45015* (2013.01); *G05B 2219/45242* (2013.01)

(58) Field of Classification Search
USPC .......................................................... 318/468
See application file for complete search history.

(56) References Cited

U.S. PATENT DOCUMENTS

| | | | | |
|---|---|---|---|---|
| 5,789,887 | A * | 8/1998 | Elischewski | G05B 19/0428 318/286 |
| 6,101,439 | A * | 8/2000 | Cutting | B60K 23/0808 477/107 |
| 6,867,565 | B2 | 3/2005 | Maistre et al. | |
| 8,907,598 | B2 | 12/2014 | Bocquet et al. | |
| 2003/0080615 | A1* | 5/2003 | Riddiford | B60T 7/042 303/155 |
| 2003/0210008 | A1 | 11/2003 | Maistre et al. | |
| 2005/0067989 | A1 | 3/2005 | Lagarde et al. | |
| 2006/0184853 | A1* | 8/2006 | Devis | E05F 15/40 714/749 |
| 2007/0260331 | A1* | 11/2007 | Rouhier | G08C 17/02 700/17 |
| 2012/0090242 | A1 | 4/2012 | Bocquet et al. | |
| 2015/0241863 | A1* | 8/2015 | Lewin | H04R 1/005 700/275 |

FOREIGN PATENT DOCUMENTS

| | | |
|---|---|---|
| CN | 101334654 A | 12/2008 |
| CN | 102536097 A | 7/2012 |
| CN | 102913118 A | 2/2013 |

OTHER PUBLICATIONS

French Search Report dated Mar. 26, 2015 issued in corresponding French application No. FR1454663; w/ English partial translation and partial machine translation (11 pages).

Chinese Office Action and search report dated Sep. 19, 2018 in corresponding Chinese patent application No. 201580037626.2 (with human English translation; 17 pages) (D1, CN102536097 and D6, U.S. Pat. No. 5,729,101 cited in the Chinese Office Action search report are not listed in this IDS since they were already listed in the IDSs filed Nov. 20, 2018 and Nov. 22, 2016, respectively).

Chinese Office Action dated Sep. 19, 2018 in corresponding Chinese patent application No. 201580037626.2 (with English translation; 14 pages).

* cited by examiner

METHOD FOR CONFIGURING AN ACTUATOR FOR THE OPERATION OF A MOVING ELEMENT IN A HOME-AUTOMATION DEVICE, AND ACTUATOR OPERATING BY THIS METHOD

The invention relates to the field of electro-mechanical actuators for the motorized operation of a moving element for closure, privacy, solar protection or screening fitted to a building, including a roller shutter, a blind or a door. Specifically, it relates to a method for the operation or a method for the configuration of such an electro-mechanical actuator. It also relates to a home-automation device or installation incorporating such an actuator.

Known soft stopping and starting functions are implemented on various motorized devices for driving a moving element for closure, privacy, solar protection or screening fitted to a building. Functions of this type can be used for noise prevention and for the restriction of mechanical stresses in drive chains for the movement of moving elements. In functions of this type, the magnitude or amplitude of the range of travel of the moving element is defined by the duration or amplitude of movement of the moving element or gear motor of the actuator which drives the moving element. A first limit of this range is defined by the stopping position of the moving element, in the case of a soft starting function, and by the position for the start of slow-down, in the case of a soft stopping function. The other limit is defined by a variable of amplitude or magnitude of the range, measured from the first limit.

Accordingly, in a soft starting function, a range of travel of the moving element is defined, within which the moving element or the gear motor which drives the moving element is progressively accelerated, then driven at a first speed. For example, acceleration from a zero speed to a first speed proceeds in accordance with a ramp, the profile of which may be linear or may incorporate one or more curves and/or an inflection, until the first defined speed is achieved. The acceleration ramp may extend over the full range of soft starting, or may encompass part of this range only. A further acceleration is then applied for the achievement of a second speed or nominal speed, which will preferably be maintained until a new soft stopping zone is recorded.

In a similar manner, in a soft stopping function, a range of travel of the moving element is defined, within which the moving element or the gear motor which drives the moving element is decelerated until a third speed is achieved, which is lower than the second speed, and is then stopped. For example, the slow-down proceeds in accordance with a ramp, the profile of which may be linear or may incorporate one or more curves and/or an inflection. The deceleration ramp may extend over the full range of soft stopping, or may encompass part of this range only.

A docking function is also known, which is implemented on various motorized devices for driving a moving element for closure, privacy, solar protection or screening fitted to a building. A function of this type can also be used for noise prevention and for the restriction of mechanical stresses in drive chains for the movement of moving elements. In a function of this type, the magnitude or amplitude of a range of travel of the moving element is defined by the duration or amplitude of movement of the moving element or gear motor of the actuator which drives the moving element. A first limit of this range is defined by the stopping position of the moving element, i.e. the position of the upper limit of travel or the position of the lower limit of travel of the moving element. The other limit is defined by a variable of amplitude or magnitude of the range, measured from the first limit. The range thus defined is also described as the docking zone. In a docking zone of this type, in addition to the progressive slow-down or acceleration of the moving element, it is also possible to implement a specific logic function for obstacle or travel stop detection, i.e. to implement a logic function for obstacle or travel stop detection which differs from that implemented outside the docking zone.

It is known that variables for the definition of such ranges can be set arbitrarily at the time of manufacture of an actuator, or at the time of installation of the actuator on the element which it is designed to drive.

Accordingly, in many situations, predefined ranges are not appropriate to a home-automation installation. Specifically in the field of roller shutters, the lengths of which are highly variable, predefined ranges do not correspond to the requirements of users.

The object of the invention is the proposal of a configuration method for the improvement of known methods from the prior art. Specifically, the invention proposes a simple configuration method which permits the optimum setting of an actuator for a rolling moving element, such as a shutter.

A method according to the invention permits the configuration of an actuator for the operation of a moving element for closure, solar protection, privacy or screening. The actuator comprises a gear motor and a gear motor electronic control unit. The electronic control unit incorporates a memory, in which at least one range of travel for the moving element has been pre-recorded. The method comprises a step for the relative modification of the magnitude of at least one range, specifically a step for the relative modification of the magnitude of the at least one range in relation to the initial data for the definition of said range.

Preferably, the initial data recorded in the memory define the magnitudes or amplitudes of various ranges employed in the operation of the actuator.

The at least one range may include:
a first range, within which the moving element is set in motion in a first direction, notably the moving element is set in motion progressively, from a zero speed; and/or
a second range, within which the moving element in motion in the first direction is slowed down, notably slowed down to a zero speed; and/or
a third range, within which a logic function for travel stop detection and/or obstacle detection while the moving element is in motion in the first direction is modified and implemented; and/or
a fourth range, within which the moving element is set in motion in a second direction, and specifically is set in motion progressively, from a zero speed; and/or
a fifth range, within which the moving element in motion in the second direction is slowed down to a zero speed; and/or
a sixth range, within which a logic function for travel stop detection and/or obstacle detection while the moving element is in motion in the second direction is modified and implemented.

The modification step may follow a modification instruction step executed by a user, an installer or a fitter.

The modification instruction step may be executed by an action on a programming tool, specifically a portable programming tool, such as a remote control unit, a tablet computer or a telephone.

The modification step may follow, and specifically may automatically follow, a step in which a characteristic of the moving element, for example its travel or the torque required for the drive thereof, is determined.

The modification step may follow the automatic determination of the pre-recorded range.

The magnitude of the at least one range may be defined by at least one variable, specifically by at least one temporal variable, such as a duration, or at least one spatial variable, such as a counter variable for the angular displacement of a gear motor shaft.

The modification step may comprise the execution of a mathematical operation on the at least one variable, specifically on the at least one initial variable, specifically a modification by the application of a multiplication factor to the at least one variable, specifically a factor within the interval [0; 2.5], or within the interval [0.5; 1.5], or a modification by the addition of a quantity to the at least one variable, specifically by the addition of a quantity relative to the at least one initial variable.

The magnitude of the first range may be defined by a first variable and/or the magnitude of the second range may be defined by a second variable and/or the magnitude of the third range may be defined by a third variable and/or the magnitude of the fourth range may be defined by a fourth variable and/or the magnitude of the fifth range may be defined by a fifth variable and/or the magnitude of the sixth range may be defined by a sixth variable. The modification may be applied in an identical manner to the first, second, third, fourth, fifth and sixth variables, or may be applied in a differentiated manner to the first, second, third, fourth, fifth and sixth variables.

The invention also relates to a computer-readable data storage medium, on which a computer program is stored containing program code means for the implementation of the steps of the aforementioned method, specifically for the implementation of the steps of the aforementioned method.

According to the invention, an electro-mechanical actuator for the operation of a moving rolling closure element comprises hardware and/or software components for the implementation of the aforementioned method, and specifically comprises an electronically-commutated DC motor.

According to the invention, a home-automation device comprises an aforementioned actuator and a moving element.

According to the invention, a home-automation installation comprises an aforementioned actuator, a moving element and a configuration tool.

The invention also relates to a computer-readable data storage medium, on which a computer program is stored containing program code means for the implementation of the phases and/or steps of the aforementioned operating method.

The invention also relates to a computer program containing appropriate program code means for the execution of the phases and/or steps of the aforementioned operating method, when said program is run on a computer.

The invention will be clarified by the following description, which is provided only as an example, with reference to the attached drawings, in which.

Figure 1:
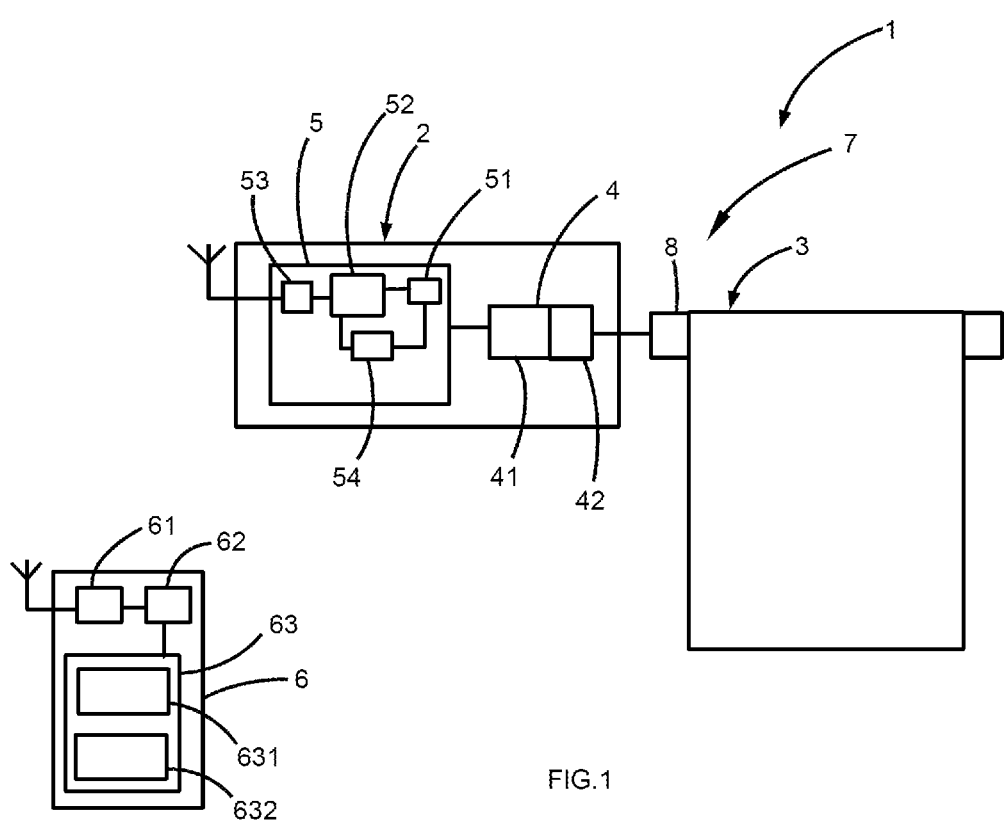
FIG. 1 represents a functional schematic diagram of a home-automation installation provided with an actuator according to the invention.

One mode of embodiment of a home-automation installation 1 according to the invention is described hereinafter with reference to FIG. 1. The home-automation installation comprises a home-automation device 7, a remote control unit 9, for example a portable remote control unit, generating commands in the form of electromagnetic signals, specifically infrared signals or radio signals, and a configuration tool 6. Instructions generated by the tool permit the configuration of the home-automation device. Instructions are generated in response to the action of a user, or an installer, or a fitter on a man-machine interface of the tool.

The home-automation device is, for example, a motorized home-automation device for closure, privacy, protection or screening, specifically including a motorized roller shutter, blind or roller door. The home-automation device comprises an actuator 2 and a moving element 3, wherein the actuator is capable of setting in motion or operating the moving element, specifically by means of a drive element 8. The home-automation device is fitted, for example, to an opening in a building for the closure thereof, for the execution of privacy function at the level thereof, or for solar protection at the level thereof. The moving element is a moving element for closure, solar protection, privacy or screening, specifically including a roller shutter, a blind, a roller gate or door. The drive element 8 is, for example, a roller tube onto which the moving element is rolled during its ascent, and from which the moving element unrolls during its descent. The actuator is thus connected mechanically, and is specifically connected in a rotating arrangement, to the drive element, and the drive element is mechanically connected to the moving element.

The actuator 2 is principally comprised of a gear motor 4 and a gear motor electronic control unit. The gear motor comprises an electric motor 41 coupled to a step-down gear box 42. The motor is preferably an electronically-commutated brushless DC motor. The electronic control unit permits the control or management of the electric power supply to the motor, specifically the successive supply of power to the motor windings. The electronic control unit comprises a memory 51, a logic processing unit 52 such as a computer, a command receiver 53, specifically a receiver for electromagnetic signals, and an element 54 for the modification of at least one variable stored in the memory. The modification element is represented separately from the logic processing unit. Alternatively, it may form part thereof.

The electronic control unit permits the management or control of the electric power supply to the motor in accordance with the various information received via the receiver 53, or via other unrepresented components, such as sensors. The electronic control unit thus permits the control of the actuator as a function of various parameters, specifically including a command received from a control point, specifically from the remote control unit, via the receiver of the actuator, and including the position of the actuator or the movement in said position. The logic processing unit permits the common management of the operation of the various elements of the electronic control unit. The logic processing unit permits the implementation of the control logic for the gear motor.

The actuator, specifically the logic electronic control unit, comprises all the hardware and/or software components required for the implementation of the operating method or the configuration method according to the invention. Specifically, certain components may be comprised of computer program modules. Hardware and/or software means comprise the element for the modification of at least one variable stored in the memory, specifically a variable for the definition of the magnitude of a range of travel of the moving element.

The configuration tool 6 comprises an instruction generator 61, a logic processing unit 62, and a man-machine interface 63. The man-machine interface comprises an element 631 for the display of information to the user, such as a monitor, and an element 632 for the input or entry of information, such as a keyboard. The display and input elements may be combined in a touchscreen. The configuration tool may be a remote control unit, a tablet computer or a telephone.

Figure 2:
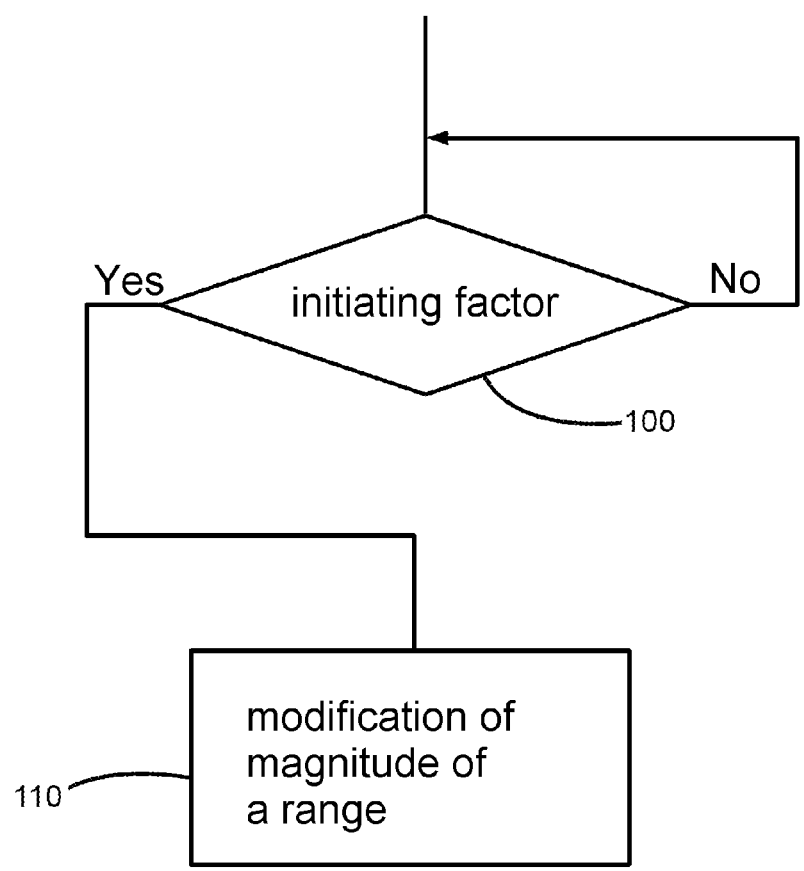
FIGS. 2 and 3 represent, in the form of flow diagrams, one method of execution of the configuration method according to the invention.

The principle of the method for the operation or configuration of an actuator according to the invention is described hereinafter, with reference to FIG. 2.

In a first phase 100, the occurrence of an initiating factor is determined. In the absence of this occurrence, the diagram loops back to phase 100. In the event of this occurrence, the diagram advances to a phase 110, in which the magnitude or amplitude of at least one range of travel of the moving element is modified.

The initiating factor may be a request or a command formulated by the user, an installer or a fitter. For example, this request may take the form of an action on the configuration tool, wherein this action is associated with a request for the modification of a parameter for soft stopping or soft starting.

Alternatively, the initiating factor may be the determination of a characteristic of the moving element 3, for example the travel thereof, or the torque required for the drive thereof.

Detection of an initiating factor preferably initiates direct progress to phase 110.

It is initially assumed that data are recorded in the memory 51, in order to permit the definition of the magnitudes or amplitudes of the various ranges used in the operation of the actuator.

The memory is assumed, for example, to contain a first stored variable Dm1, a second variable Dm2, a third variable Dd1 and a fourth variable Dd2. A fifth variable D5 and a sixth variable D6 may also be defined.

Figure 4:
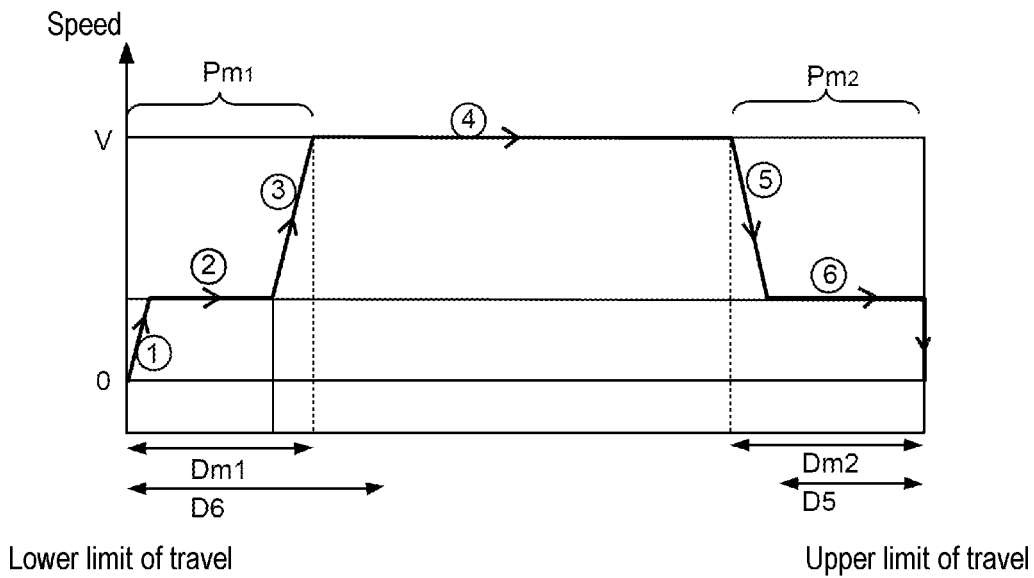
FIG. 4 is a schematic diagram of an example of variations in speed of a gear motor, or of a moving element driven by said gear motor, as a function of time during the rising travel of a moving element between a lower limit of travel and an upper limit of travel.

As represented in FIG. 4, the first variable Dm1 defines a first range Pm1 of travel of the moving element, within which the moving element or the gear motor driving the moving element upwards is accelerated (phase ①) then maintained at a first speed (phase ②), before being accelerated once more to achieve the second set-point speed (phase ③). The moving element or the reducing gear driving the moving element is then maintained at the second speed (phase ④). For example, acceleration from a zero speed to the first speed proceeds in accordance with a ramp, the profile of which may be linear or may incorporate one or more curves and/or an inflection. The acceleration ramps preferably occupy a minimum proportion of the soft starting range. Maximum acceleration may be required, depending upon the capacities of the motor and the speed value to be achieved.

As represented in FIG. 4, the second variable Dm2 defines a second range Pm2 of travel of the moving element, within which the moving element or the gear motor driving the moving element upwards is slowed down to a third speed, which is lower than the second speed (phase ⑤) then maintained at the third speed (phase ⑥), before being stopped. For example, the slow-down proceeds in accordance with a ramp, the profile of which may be linear or may incorporate one or more curves and/or an inflection. The deceleration ramp occupies only a proportion of this second range, specifically less than one quarter of said range.

Figure 5:
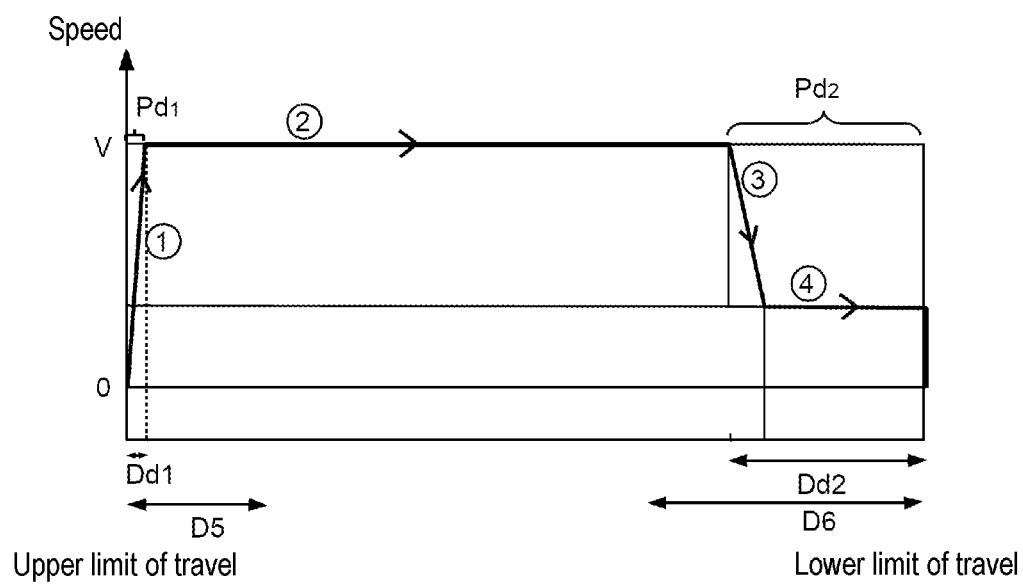
FIG. 5 is a schematic diagram of an example of variations in speed of a gear motor, or of a moving element driven by said gear motor, as a function of time during the descending travel of a moving element between an upper limit of travel and a lower limit of travel.

As represented in FIG. 5, the third variable Dd1 defines a third range Pd1 of travel of the moving element, within which the mobile element or the gear motor driving the moving element downwards is accelerated (phase ①), such that a fourth speed is rapidly achieved, corresponding to the rated downward speed (phase ②). Alternatively to the representation shown in FIG. 5, the speed profile in the third range may be similar to that in the first range. Accordingly, for example, acceleration between a zero speed and the fourth speed proceeds in accordance with a ramp, the profile of which may be linear or may incorporate one or more curves and/or an inflection. The acceleration ramps preferably occupy a minimum proportion of the soft starting range. Maximum acceleration may be required, depending upon the capacities of the motor and the speed value to be achieved.

As represented in FIG. 5, the fourth variable Dd2 defines a fourth range Pd2 of travel of the moving element, within which the mobile element or the gear motor driving the moving element downwards is slowed down (phase ③) to a fifth speed, which is lower than the fourth speed, then maintained at the fifth speed (phase ④), before being stopped. For example, the slow-down proceeds in accordance with a ramp, the profile of which may be linear or may incorporate one or more curves and/or an inflection. The deceleration ramp occupies only a proportion of this fourth range, specifically less than one quarter of said range.

The fifth variable D5 defines a range P5 of travel of the moving element within which a specific logic function or strategy is implemented for obstacle and/or travel stop detection at the approach to a first limit of travel of the moving element, specifically an upper limit of travel. This fifth variable may define a magnitude from the position of the first limit of travel. Within this fifth range of travel of the moving element, the logic function or strategy for obstacle and/or travel stop detection is modified in relation to that implemented outside this range.

The sixth variable D6 defines a range P6 of travel of the moving element within which a specific logic function or strategy is implemented for obstacle and/or travel stop detection at the approach to a second limit of travel of the moving element, specifically a lower limit of travel. This sixth variable may define a magnitude from the position of the second limit of travel. Within this sixth range of travel of the moving element, the logic function of strategy for obstacle and/or travel stop detection is modified in relation to that implemented outside this range.

The magnitudes of these ranges are defined, for example, by temporal data, such as durations, or by spatial data, such as counter variables for the angular displacement of a gear motor shaft.

For example, initially, i.e. at the end of manufacture of the actuator or prior to the implementation of the configuration method according to the invention, these variables may be as follows:

Dm1=1 second;
Dm2=2.5 seconds;
Dd1=0.5 seconds;
Dd2=3.5 seconds;

D5=1.5 seconds;

D6=3.5 seconds.

In other words, the initial variables are not the variables obtained further to initial first configuration procedure.

One or more initial variable values may be dependent upon parameters relating to the moving element, for example the type of moving element or the size of the moving element. One or more initial variable values may be defined by a first configuration operation which does not involve the implementation of the method according to the invention. For example, one or more initial variable values may be defined by positional information corresponding to blind slats in a partially opened state, or deduced from such information. Automatic initialization of initial variable values provides the optimum response to the issues described, i.e. the simple and appropriate configuration of a motorized roller shutter installation, in relation to the initial data supplied by the manufacturer. Specifically, initial data are deduced from the length of the roller shutter. For example, the length of range D2 associated with docking at the lower limit of travel represents 15% of the total travel of the shutter.

The values of variables may thus all be different or all identical. In the latter case, a single variable can be used to define the amplitudes of a number of ranges, if not all the ranges. All values may be parameterizable. Alternatively, certain values are defined and are not parameterizable.

In certain cases, the second speed may have a value which differs from a rated high speed, ranging from 12 to 17 r.p.m. For example, it may assume a low rated speed value, ranging from 6 to 10 r.p.m. The ranges of travel corresponding to operating ranges for soft starting or stopping will therefore be adapted automatically, specifically as the acceleration or deceleration ramps are different in both cases.

In phase 110, all or part of the variables may be modified. Modification may involve the execution of a mathematical operation on the at least one variable, specifically a modification by the application of a multiplication factor to the at least one variable, specifically a factor within the interval [0; 2.5], or within the interval [0.5; 1.5], or a modification by the addition of a quantity to the at least one variable. In the case of modification by the application of a multiplication factor, the factor can be expressed as a percentage, for example 50% for 0.5, 100% for 1 and 150% for 1.5.

In the case of modification by the addition of a quantity, the quantity may naturally be positive or negative.

The modification may be applied in a differentiated manner to the different variables. For example, from a single modifying value, such as a percentage value, it is possible to apply different modifying values to different variables. This permits, for example, the consideration of the difference in the speed of movement of the moving element induced by the change of diameter of the winding.

Alternatively, the modification can be applied in an identical manner to different variables.

As a further alternative, a specific modification can be applied to each of the different variables.

The modification of one or more values, and consequently the modification of one or more magnitudes of ranges, may be restricted. For example, a multiplication factor may be set within a mandatory interval, such as 50-200%. In this way, for example, it is possible to guarantee the existence of a range of magnitude other than zero, in order to prevent damage, specifically associated with docking to the travel stop at excessively high speed. In this way, it is also possible to avoid ranges of excessive magnitude, which might lead the user to assume the existence of a problem or a malfunction of the actuator. This permits a high degree of flexibility in configuration, whilst remaining within the limits of a framework which is appropriate to each situation and installation.

Figure 3:
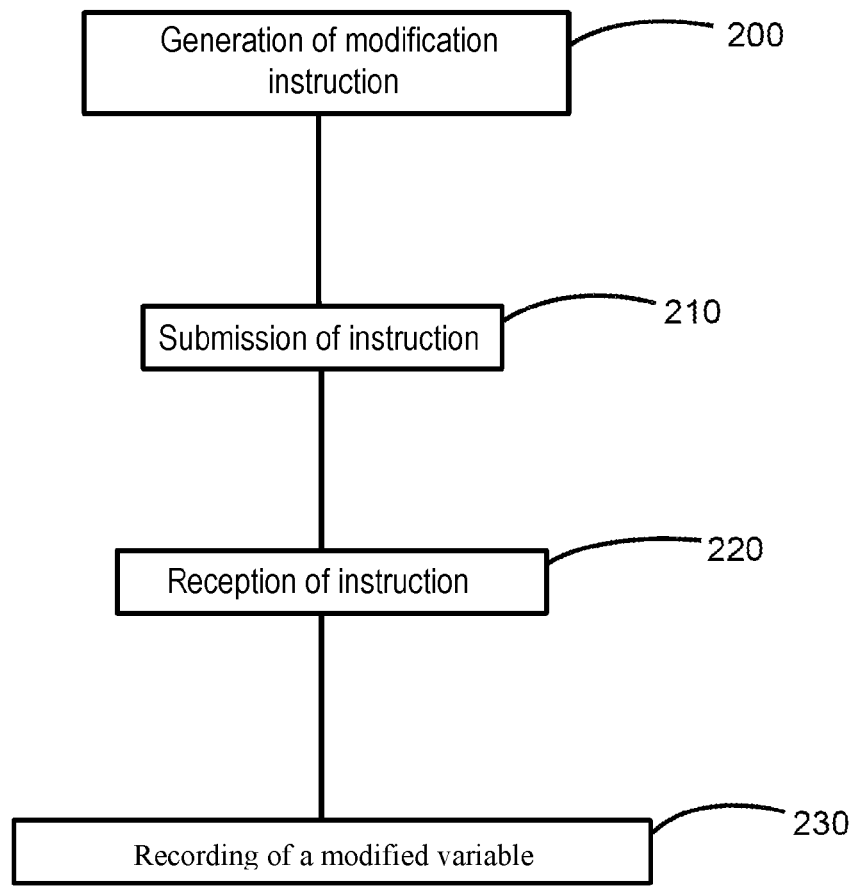

A first mode of execution of a method for the operation or configuration of an actuator according to the invention is described hereinafter, with reference to FIG. 3.

Steps 200 to 230 are, for example, included in phase 110.

In a first step 200, an instruction or request for modification is generated. This instruction is executed, for example, further to an action of the user on the configuration tool. The instruction is, for example, generated by means of a dialogue between the configuration tool and the user, via the man-machine interface. In this dialogue, the user may input or enter data in response to requests formulated by the tool. For example, the tool may request that the user indicate or select the ranges which they wish to modify, and request that the user indicate the extent to which they wish to modify the ranges. The user, in turn, can indicate or select the ranges which they wish to modify. The user also indicates the relative extent to which they wish to modify the ranges. The instruction generated contains information for the modification of one or more variables for the definition of ranges. Specifically, the user can modify values by predefined increments, for example 1% or 10%. Alternatively, the user does not have access to quantitative values on the man-machine interface, but to levels, specifically levels associated with functions. However, these levels on the man-machine interface correspond to relative values in relation to the initial variable.

In a second step 210, the instruction generated is transmitted to the actuator.

In a third step 220, the instruction transmitted is received and interpreted by the actuator.

In a fourth step 230, the magnitudes of one or more variables for the definition of ranges are modified. This is achieved by means of an element 54 for the modification of at least one variable stored in the memory 51. In practice, this element permits the clearance of values stored in the memory for the definition of one or more ranges, and the logging in their place of one or more modified values, obtained as explained above.

Further steps may be implemented, specifically for the restoration of default values. In this case, an instruction or request for resetting is generated. This instruction is executed, for example, in response to an action of the user on the configuration tool, specifically via the man-machine interface.

According to the above description, the modification of the magnitude of a range is executed relatively to an initial variable. In operation, the range thus defined is fixed.

In another mode of embodiment, the initial variable may be a variable element which is dependent, for example, upon the remaining distance of travel between the starting point and the limit of travel towards which the shutter is driven. Accordingly, a modification relative to the initial variable can be simply accommodated in a variable range, thus permitting the shutter to remain within its safe limits and to exhibit a behaviour which is entirely appropriate to the requirements of users.

Thus, for example, if the variable range is defined by a value of 15% of the travel to be executed, and the selected multiplication factor for the modification is equal to 1.5, the selection of the entry or exit position from the zone thus defined will be based upon a relative value of 15%×1.5×the remaining distance of travel.

By means of a method according to the invention and an actuator according to the invention, it is possible to achieve the precise adaptation of the operation of the actuator to the application of the latter. In practice, as required, the different ranges can be simply adapted for the achievement of varying degrees of dynamic behaviour by the moving elements driven.

The invention claimed is:

1. A method for configuring an actuator for operation of a moving element for closure, solar protection, privacy or screening,
   wherein the actuator comprises a gear motor and a gear motor electronic control unit, the electronic control unit incorporating a memory in which at least one range of travel of the moving element has been pre-recorded,
   wherein an initial data recorded in the memory define magnitudes of different ranges used in operation of the actuator,
   wherein the method comprises performing a relative modification of a magnitude of the at least one range in relation to the initial data for the definition of the at least one range,
   wherein the magnitude of the at least one range is defined by at least one variable, which is at least one selected from the group consisting of a temporal variable and a spatial variable,
   wherein the modification comprises executing a mathematical operation on the at least one initial variable, which is a modification by application of a multiplication factor to the at least one variable, or a modification by addition of a quantity to the at least one variable,
   wherein there are at least six ranges and wherein at least one selected from the group consisting of:
      a magnitude of a first range among the at least six ranges is defined by a first variable,
      a magnitude of a second range among the at least six ranges is defined by a second variable,
      a magnitude of a third range among the at least six ranges is defined by a third variable,
      a magnitude of a fourth range among the at least six ranges is defined by a fourth variable,
      a magnitude of a fifth range among the at least six ranges is defined by a fifth variable, and
      a magnitude of a sixth range among the at least six ranges is defined by a sixth variable,
   wherein the modification is applied in an identical manner to the first, second, third, fourth, fifth and sixth variables, or the modification is applied in a differentiated manner to the first, second, third, fourth, fifth and sixth variables.

2. The method according to claim 1, wherein the at least one range includes at least one selected from the group consisting of:
   the first range, within which the moving element is set in motion in a first direction, wherein the moving element is set in motion progressively, from a zero speed;
   the second range, within which the moving element in motion in the first direction is slowed down to a zero speed;
   the third range, within which a logic function for travel stop detection and/or obstacle detection while the moving element is in motion in the first direction is modified and implemented;
   the fourth range, within which the moving element is set in motion in a second direction, wherein the moving element is set in motion progressively, from a zero speed;
   the fifth range, within which the moving element in motion in the second direction is slowed down to a zero speed; and
   the sixth range, within which a logic function for travel stop detection and/or obstacle detection while the moving element is in motion in the second direction is modified and implemented.

3. The method according to claim 1, wherein the modification follows a modification instruction step executed by a user or an installer or a fitter.

4. The method according to claim 3, wherein the modification instruction is executed by an action on a portable programming tool.

5. The method according to claim 1, wherein the modification automatically follows performing a determination of a characteristic of the moving element.

6. The method according to claim 1, wherein the modification follows an automatic determination of the pre-recorded range.

7. A non-transitory computer-readable data storage medium, on which a computer program is stored containing program code which, when executed by a computer, implements a method for configuring an actuator for operation of a moving element for closure, solar protection, privacy or screening,
   wherein the actuator comprises a gear motor and a gear motor electronic control unit, the electronic control unit incorporating a memory in which at least one range of travel of the moving element has been pre-recorded,
   wherein an initial data recorded in the memory define magnitudes of different ranges used in operation of the actuator,
   wherein the method comprises performing a relative modification of a magnitude of the at least one range in relation to the initial data for the definition of the at least one range,
   wherein the magnitude of the at least one range is defined by at least one variable, which is at least one selected from the group consisting of a temporal variable and a spatial variable,
   wherein the modification comprises executing a mathematical operation on the at least one initial variable, which is a modification by application of a multiplication factor to the at least one variable, or a modification by addition of a quantity to the at least one variable,
   wherein there are at least six ranges and wherein at least one selected from the group consisting of:
      a magnitude of a first range among the at least six ranges is defined by a first variable,
      a magnitude of a second range among the at least six ranges is defined by a second variable,
      a magnitude of a third range among the at least six ranges is defined by a third variable,
      a magnitude of a fourth range among the at least six ranges is defined by a fourth variable,
      a magnitude of a fifth range among the at least six ranges is defined by a fifth variable, and
      a magnitude of a sixth range among the at least six ranges is defined by a sixth variable,
   wherein the modification is applied in an identical manner to the first, second, third, fourth, fifth and sixth variables, or the modification is applied in a differentiated manner to the first, second, third, fourth, fifth and sixth variables.

8. An electro-mechanical actuator for operation of a moving rolling closure element, wherein the actuator comprises a gear motor and a gear motor electronic control unit, wherein the electronic control unit incorporates a memory in which at least one range of travel of the element has been pre-recorded, wherein an initial data recorded in the memory define magnitudes of different ranges used in operation of the actuator, and hardware and/or software arranged to implement a method for configuring the actuator for the operation of a moving element for closure, solar protection, privacy or screening, the method comprising performing a relative modification of a magnitude of the at least one range in relation to the initial data for the definition of the at least one range, wherein the actuator comprises an electronically-commutated DC motor, wherein the magnitude of the at least one range is defined by at least one variable, which is at least one selected from the group consisting of a temporal variable and a spatial variable, wherein the modification comprises executing a mathematical operation on the at least one initial variable, which is a modification by application of a multiplication factor to the at least one variable, or a modification by addition of a quantity to the at least one variable, wherein there are at least six ranges and wherein at least one selected from the group consisting of:
  a magnitude of a first range among the at least six ranges is defined by a first variable,
  a magnitude of a second range among the at least six ranges is defined by a second variable,
  a magnitude of a third range among the at least six ranges is defined by a third variable,
  a magnitude of a fourth range among the at least six ranges is defined by a fourth variable,
  a magnitude of a fifth range among the at least six ranges is defined by a fifth variable, and
  a magnitude of a sixth range among the at least six ranges is defined by a sixth variable, wherein the modification is applied in an identical manner to the first, second, third, fourth, fifth and sixth variables, or the modification is applied in a differentiated manner to the first, second, third, fourth, fifth and sixth variables.

9. A home-automation device comprising:
the actuator according to claim 8, and
a moving element.

10. Home-automation installation comprising:
the actuator according to claim 8,
a moving element, and
a configuration tool.

11. The electro-mechanical actuator according to claim 8, wherein the gear motor is the electronically-commutated DC motor.

12. The method according to claim 4, wherein the portable programming tool is a remote control unit, a tablet computer or a telephone.

13. The method according to claim 5, wherein the characteristic of the moving element which is determined is a travel of the moving element or a torque required for driving the moving element.

14. The method according to claim 1, wherein the magnitude of the at least one range is defined by a temporal variable which is a duration.

15. The method according to claim 1, wherein the magnitude of the at least one range is defined by a spatial variable which is a counter variable for the angular displacement of a shaft of the gear motor.

16. The method according to claim 1, wherein the modification is by application of a multiplication factor to the at least one variable, which is a factor within the interval [0; 2.5].

17. The method according to claim 1, wherein the modification is by addition of a quantity to the at least one variable, which is a quantity relative to the at least one initial variable.

18. The method according to claim 1, wherein the modification is applied in a differentiated manner to the first, second, third, fourth, fifth and sixth variables so that, from a single modifying value, different modifying values are applied to the first, second, third, fourth, fifth and sixth variables.

19. The non-transitory computer-readable data storage medium according to claim 7, wherein the modification is applied in a differentiated manner to the first, second, third, fourth, fifth and sixth variables so that, from a single modifying value, different modifying values are applied to the first, second, third, fourth, fifth and sixth variables.

20. The electro-mechanical actuator according to claim 8, wherein the modification is applied in a differentiated manner to the first, second, third, fourth, fifth and sixth variables so that, from a single modifying value, different modifying values are applied to the first, second, third, fourth, fifth and sixth variables.

* * * * *